United States Patent
Kikuchi et al.

(10) Patent No.: US 6,222,328 B1
(45) Date of Patent: Apr. 24, 2001

(54) HORIZONTAL DEFLECTION CIRCUIT

(75) Inventors: Ken Kikuchi, Tokyo; Junzo Watanabe; Hidetaka Honji, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/446,311

(22) PCT Filed: Apr. 21, 1999

(86) PCT No.: PCT/JP99/02117

§ 371 Date: Mar. 13, 2000

§ 102(e) Date: Mar. 13, 2000

(87) PCT Pub. No.: WO99/55077

PCT Pub. Date: Oct. 28, 1999

(30) Foreign Application Priority Data

Apr. 21, 1998 (JP) .................................................. 10-111051
Apr. 21, 1998 (JP) .................................................. 10-111052

(51) Int. Cl.[7] ...................................................... H01J 29/56
(52) U.S. Cl. ........................... 315/399; 315/364; 315/370
(58) Field of Search ......................... 315/368.25, 368.28, 315/364, 370, 388, 399, 387, 400

(56) References Cited

U.S. PATENT DOCUMENTS

| | | | |
|---|---|---|---|
| 4,206,388 | 6/1980 | Ishigaki et al. | 315/371 |
| 4,242,714 | 12/1980 | Yoshida et al. | 361/152 |
| 4,634,938 | 1/1987 | Haferl | 315/371 |
| 5,341,072 | * 8/1994 | Watanabe et al. | 315/408 |
| 5,466,993 | * 11/1995 | Leaver | 315/387 |
| 5,754,015 | * 5/1998 | Nagaoka et al. | 315/399 |

FOREIGN PATENT DOCUMENTS

| | | |
|---|---|---|
| 62-186557 | 11/1987 | (JP) . |
| 64-023685 | 1/1989 | (JP) . |
| 02107067 | 4/1990 | (JP) . |
| 05083578 | 4/1993 | (JP) . |
| 05091361 | 4/1993 | (JP) . |
| 09093457 | 4/1997 | (JP) . |
| 09191413 | 7/1997 | (JP) . |
| 09331466 | 12/1997 | (JP) . |
| 11127364 | 5/1999 | (JP) . |

* cited by examiner

Primary Examiner—Don Wong
Assistant Examiner—Wilson Lee
(74) Attorney, Agent, or Firm—Jay H. Maioli

(57) ABSTRACT

A horizontal deflection circuit capable of performing various corrections. It is characterized by grounding one end of a first parallel circuit connecting a first switching element 11, a first damper diode 12, and a first resonance capacitor 13 in parallel, connecting the other end of the first parallel circuit to one end of a second parallel circuit connecting a second switching element 21, a second damper diode 22, and a second resonance capacitor 23 in parallel, and further connecting the other end of this first parallel circuit to a direct-current power source terminal through a primary winding of a flyback transformer 6, grounding the other end of this second parallel circuit through a series circuit of a horizontal deflection coil 4 and an S-curve correction capacitor 5, grounding the connection middle point of the horizontal deflection coil 4 and S-curve correction capacitor 5 through a parallel circuit of an intermediate pincushion distortion correction circuit 60 and a horizontal linearity correction circuit 70, and installing switching element control means 40 for switching the first switching element 11 by a horizontal drive signal, and controlling the OFF start timing and OFF period of the second switching element 21.

4 Claims, 8 Drawing Sheets

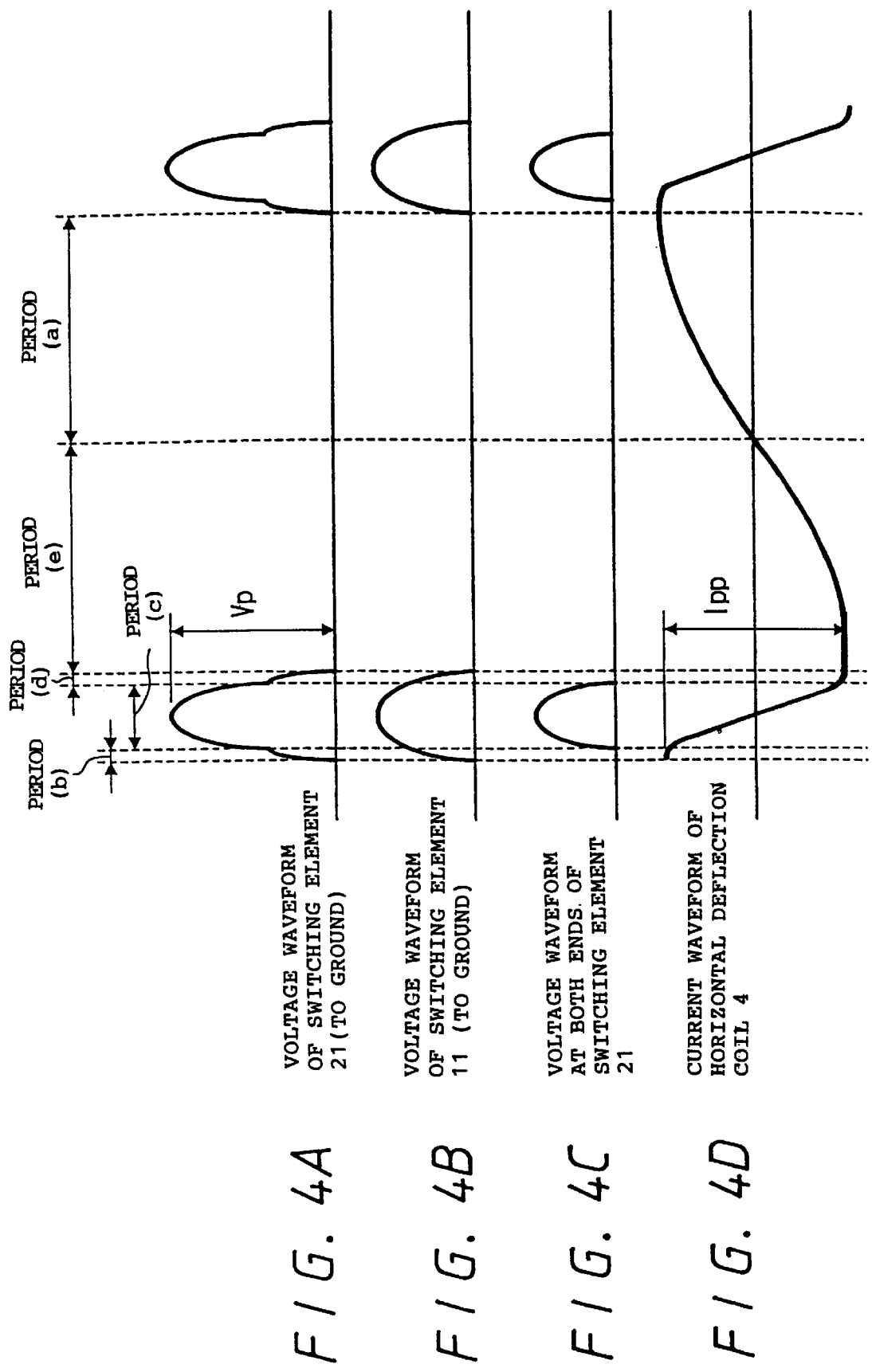

HORIZONTAL DEFLECTION CIRCUIT

TECHNICAL FIELD

The present invention relates to a horizontal deflection circuit used in a television receiver or a display device using a cathode-ray tube (CRT), and more particularly to a horizontal deflection circuit capable of correcting pincushion distortion or adjusting the screen size in the horizontal direction.

BACKGROUND ART

For example, in a television receiver, in order to correct pincushion distortion, it is known to use a diode modulation circuit in a horizontal deflection circuit.

In the diode modulation circuit, the damper diode of the horizontal deflection circuit is composed of two diodes connected in series, and a pincushion modulation coil is connected in series to a horizontal deflection coil, and the connection middle point of two diodes and the connection middle point of the horizontal deflection coil and pincushion modulation coil are connected through an S-curve correction capacitor. To the diode at the side connected parallel to the pincushion modulation coil, a switching element for correction of pincushion distortion is connected in parallel.

This switching element for correction of pincushion distortion is synchronized with the horizontal pulse, and is turned on in the latter half of the retrace interval of horizontal deflection. The width of this ON period is modulated parabolically in the vertical period. By thus changing the width of the ON period of the switching element for correction of pincushion distortion, the quantity of deflection current distributed from the horizontal deflection coil into the pincushion modulation coil changes periodically, and the deflection current is modulated parabolically in the vertical period, and the pincushion distortion is corrected.

At the same time, since the current flowing in the S-curve correction capacitor is also modulated parabolically in the vertical period, the S-curve correction is also changed in the vertical period, and is smaller in the top and bottom of the screen and large in the center, so that the intermediate pincushion distortion is also corrected.

In the horizontal deflection circuit having such diode modulation circuit, in order to correct the horizontal linearity distortion caused due to presence of internal resistance of the horizontal deflection coil, it is known to connect a horizontal linearity correction coil composed of a magnetically biased saturable reactor in series to the horizontal deflection coil.

When using such diode modulation circuit for correcting pincushion distortion, a sufficiently large correction amount of pincushion distortion is obtained as compared with the conventional pincushion distortion correction circuit using saturable reactor, and therefore it is used in the television receiver or display device using a wide-angle CRT requiring a large correction amount, in particular.

However, a problem occurs when the horizontal deflection circuit using such diode modulation circuit is applied in the television receiver or the like of progressive scanning system, that is, the double speed scanning system coming into use recently. This problem is described below.

In the television receiver of progressive scanning system, since the horizontal deflection frequency is two times as high as that of the ordinary scanning system, that is, interlaced scanning system, the retrace interval of the horizontal deflection current is ½. Considering the dielectric strength of the switching element for horizontal output, if the voltage of the retrace pulse is not changed, the maximum amplitude of the horizontal deflection current must be doubled. Accordingly, a switching element of a large capacity is needed, the circuit cost is raised, and the power consumption of the switching element and its peripheral elements is increased.

It is hence desired to employ the horizontal deflection circuit using such diode modulation circuit in the television receiver or the like of double speed scanning system without increasing the power consumption.

Previously, the present applicant proposed, as a horizontal deflection circuit for use in a television receiving using a CRT, a horizontal deflection circuit capable of applying a voltage of about 2 kv to the horizontal deflection coil by using two switching elements, and saving the power consumption and reducing the cost substantially by regulating the horizontal deflection current of the television receiver scanning at double speed to the level of an ordinary television receiver in Japanese Patent Application No. 9-221366 (U.S. patent application Ser. No. 133,992).

In this proposed horizontal deflection circuit, one end of a parallel circuit of a first switching element, a first damper diode, and a first resonance capacitor is grounded, and one end of a parallel circuit of a second switching element, a second damper diode, and a second resonance capacitor, and one end of a primary winding coil of a flyback transformer are connected to other end of the first switching element, a direct-current voltage is supplied to this connection point through the primary winding coil of the flyback transformer, a horizontal deflection coil is connected to other end of the second switching element, an S-curve correction capacitor is connected in series to the horizontal deflection coil, and the other end of the S-curve correction capacitor is grounded, and further switching element control means for controlling the OFF start timing and OFF period of the second switching element is provided.

According to this proposed horizontal deflection circuit, the withstand voltage of the switching element for horizontal output may be low, and the retrace pulse voltage applied to the horizontal deflection coil is large and the deflection current is small, so that the power loss of the deflection system is decreased, and moreover screen size adjustment in the horizontal direction and distortion correction can be done easily.

However, in the horizontal deflection circuit proposed in Japanese Patent Application No. 9-221366, although the S-curve is corrected by the S-curve correction capacitor connected in series to the horizontal deflection coil, the correction amount is not changed, and therefore the intermediate pincushion distortion is not corrected.

To correct the intermediate pincushion distortion, it may be considered to employ a diode modulation system, but since the circuit type is different, intermediate pincushion distortion cannot be corrected by the same method.

Similarly, in the horizontal linearity correction, in the proposed horizontal deflection circuit, since it is different from the horizontal deflection circuit of diode modulation system, horizontal linearity transformer cannot be used, and pincushion imbalance occurs between the right and left side of the screen.

Besides, when the horizontal linearity correction coil or horizontal linearity correction transformer is used, the voltage at both ends applied to the horizontal deflection coil is decreased by the portion of the voltage at both ends applied to the coil. As a result, the capacity and efficiency of the power source cannot be fully utilized, which may lead to problems of increase of power consumption and generation of heat.

Therefore, if the horizontal linearity can be corrected by using a switching element, it is not only advantageous for power consumption, but also easy for control of correction characteristic and possible to lower the cost. It is hence desired to realize a horizontal deflection circuit capable of correcting horizontal linearity by using a switching element.

In the light of the background discussed above, it is an object of the invention to correct intermediate pincushion distortion, horizontal linearity and others as efficiently as in the horizontal deflection circuit of the conventional diode modulation system, in a horizontal deflection circuit using two switching elements, capable of applying a voltage of about 2 kV to the horizontal deflection coil, regulating the horizontal deflection current of scanning at double speed at a level of an ordinary horizontal deflection circuit, saving the power consumption, and lowering the cost substantially.

It is also an object of the invention to keep constant the high voltage direct-current voltage obtained from the secondary winding of the flyback transformer, even in the case of such corrections.

DISCLOSURE OF THE INVENTION

A horizontal deflection circuit of the present invention is characterized by grounding one end of a first parallel circuit connecting a first switching element, a first damper diode, and a first resonance capacitor in parallel, connecting other end of the first parallel circuit to one end of a second parallel circuit connecting a second switching element, a second damper diode, and a second resonance capacitor in parallel, and further connecting the connection point of other end of the first parallel circuit and one end of the second parallel circuit to a direct-current power source through a primary winding of a flyback transformer, grounding the other end of the second parallel circuit through a series circuit of a horizontal deflection coil and an S-curve correction capacitor, grounding the connection middle point of the horizontal deflection coil and S-curve correction capacitor through a parallel circuit of an intermediate pincushion distortion correction circuit and a horizontal linearity correction circuit, and installing switching element control means for switching the first switching element by a horizontal drive signal, and controlling the OFF start timing and OFF period of the second switching element.

According to the present invention, since the circuit is composed so as to ground the S-curve correction capacitor connected in series to the horizontal deflection coil, it is easy to correct various deflection systems connecting a specified circuit element or a specified circuit between this S-curve correction capacitor and the ground.

Accordingly, connecting in parallel to the S-curve correction capacitor, by assembling an intermediate pincushion distortion correction circuit and a horizontal linearity correction circuit, a voltage for correction can be superposed at both ends of the S-curve correction capacitor, and the voltage at both ends of the horizontal deflection coil can be varied, so that various deflection systems can be corrected.

The invention also presents a horizontal deflection circuit which is characterized by grounding one end of a first parallel circuit connecting a first switching element, a first damper diode, and a first resonance capacitor in parallel, connecting the other end of the first parallel circuit to one end of a second parallel circuit connecting a second switching element, a second damper diode, and a second resonance capacitor in parallel, and further connecting the connection point of other end of the first parallel circuit and one end of the second parallel circuit to a direct-current power source through a primary winding of a flyback transformer, grounding the other end of the second parallel circuit through a series circuit of a horizontal deflection coil and an S-curve correction capacitor, and installing switching element control means for switching the first switching element by a horizontal drive signal, and controlling the OFF start timing and OFF period of the second switching element, in which capacity varying means for varying the capacity of the first resonance capacitor is also provided to keep constant the high voltage generated by the flyback transformer by varying the capacity of the first resonance capacitor in a horizontal retrace interval.

BRIEF DESCRIPTION OF DRAWINGS

FIG. 4 is a waveform diagram for explaining a basic horizontal deflection operation in the horizontal deflection circuit shown in FIG. 1.

BEST MODE FOR CARRYING OUT THE INVENTION

A first embodiment of a horizontal deflection circuit of the invention is described below while referring to FIG. 1 to FIG. 5.

Figure 1:
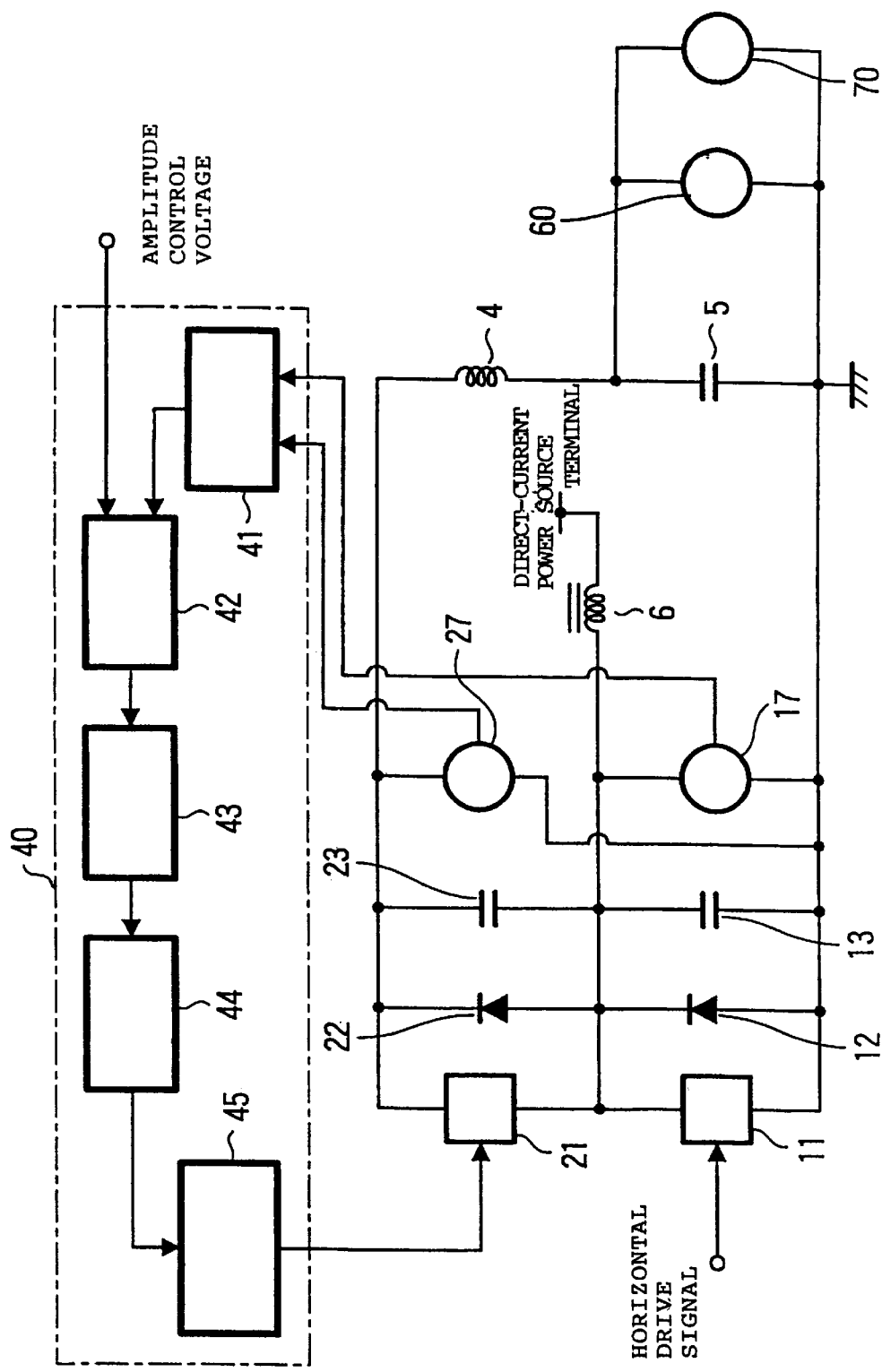
FIG. 1 is a structural diagram showing a first embodiment of a horizontal deflection circuit of the invention.

As shown in FIG. 1, the horizontal deflection circuit in the first embodiment is composed of a parallel circuit of a switching element 11 for horizontal output, a damper diode 12, and a resonance capacitor 13, and a parallel circuit of a switching element 21, a damper diode 22, and a resonance capacitor 23, which are connected in series, in which a power source is supplied to this connection point through a primary winding of a flyback transformer 6. The end of the opposite side of the connection point of the switching element 11 is grounded, the end of the opposite side of the connection point of the switching element 21 is connected to a horizontal deflection coil 4, one end of an S-curve correction capacitor 5 is connected in series to this horizontal deflection coil, and other end of the S-curve correction capacitor is grounded.

This horizontal deflection circuit comprises pulse reading circuits 17, 27 for reading the voltage at both ends of the switching elements 11, 21, and a switching element control circuit 40 for controlling on/off of the switching element 21 by operating on the basis of this voltage.

The operation of this circuit is explained below while referring to FIG. 1, FIG. 4, and FIG. 5.

In FIG. 1, a horizontal drive signal is fed into the switching element 11 for horizontal output, and the switching element 11 for horizontal output is turned on. At the same time, the switching element 21 is also turned on by a drive signal from the switching element control circuit 40, and the both are set in conductive state, and a deflection current flows in the horizontal deflection coil 4. By contrast, when turning off, the switching element 11 is driven to be turned off ahead of the switching element 21, and the retrace interval (horizontal retrace interval) begins. In this retrace interval, the switching element 21 is controlled to be turned on or off by the switching element control circuit 40. The series of operations is explained below by dividing the horizontal deflection period and using an equivalent circuit.

<Trace Interval (a)>

Figure 5A:
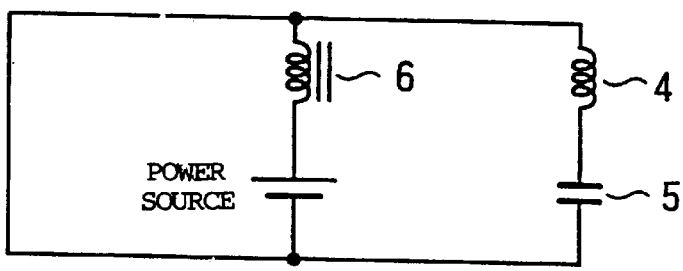
FIG. 5 is an equivalent circuit diagram for explaining a basic horizontal deflection operation in the horizontal deflection circuit shown in FIG. 1.

The trace interval (a) is the conductive period of both switching elements 11 and 21, and the equivalent circuit is as shown in FIG. 5A, which is same as the constitution of the horizontal deflection circuit composed of one stage of switching element known hitherto. At this time, both deflection current and flyback transformer current increase at an inclination corresponding to the voltage at both ends of the S-curve correction capacitor 5 and supply voltage, respectively. The waveform of deflection current at this time is shown in FIG. 4D.

<Initial Phase of Retrace Interval>

Figure 5B:
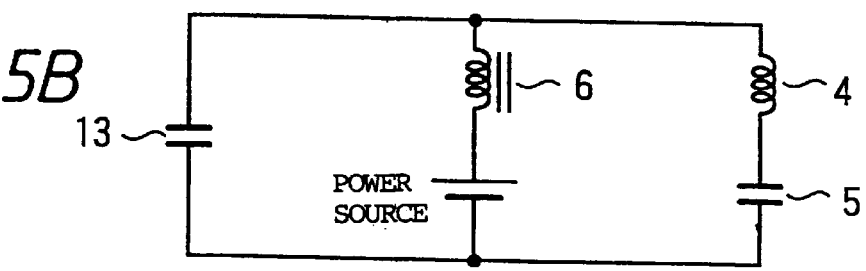

When getting into the retrace interval, first the switching element 11 is turned off by a horizontal drive signal. At this time, the switching element 21 is still conductive, and the equivalent circuit becomes as shown in FIG. 5B, which is same as an ordinary horizontal deflection circuit. At this time, the current flowing into the flyback transformer 6 and horizontal deflection coil 4 begins to flow into the resonance capacitor 13, and a voltage is generated at both ends of the resonance capacitor 13, and the current begins to be inverted by it. That is, the resonance operation starts, and the voltage and current waveform is the waveform shown in interval (b) in FIG. 4.

<OFF Period of Switching Element 21 in Retrace Interval>

Figure 5C:
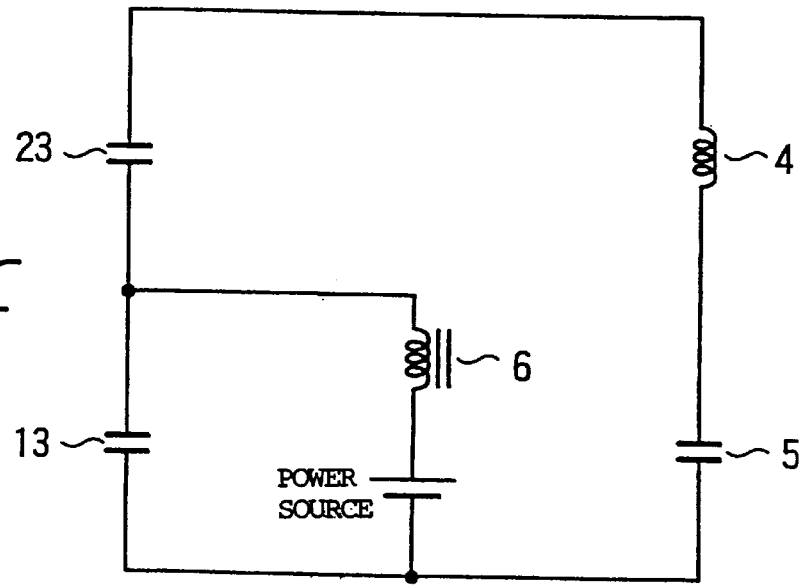

After the deflection current has reached 0 in the latter half of the retrace interval, if the switching element 21 is turned off, the equivalent circuit remains same as in FIG. 5B and no change occurs because of the presence of the damper diode 22, but when the switching element 21 is turned off 21 before the deflection current reaches 0 in the first half of the retrace period, the equivalent circuit is changed as shown in FIG. 5C, and another resonance capacitor 23 is connected in series to the horizontal deflection coil 4.

The deflection current also flows into the resonance capacitor 23, and a voltage is generated at both ends of the resonance capacitor 23, and therefore a pulse voltage larger than the pulse at both ends of the switching element 11 can be applied at both ends of the horizontal deflection coil 4 (see FIG. 4A).

Herein, the peak value of the retrace pulse voltage at both ends of the switching element 11 is mainly determined by the supply voltage and ratio of retrace time and trace time, and this pulse (see FIG. 4B) can be boosted by the flyback transformer 6 (only primary winding shown) to a high voltage to be used in the CRT.

<Latter Half of Retrace Interval>

The retrace interval is terminated when all the electric charge once flowing into the resonance capacitors 13, 23 flows out and the voltage at both ends becomes 0, and the damper diode conducts automatically (the diode is shown as an ideal diode for the sake of simplicity).

Herein, the since the current flowing into the resonance capacitor 23 is always smaller than the current flowing into the resonance capacitor 13, the electric charge is used up earlier in the resonance capacitor 23, and the damper diode 22 conducts ahead of the damper diode 12. Therefore, the pulse generated at both ends of the switching element 21 is narrower in the pulse width as compared with the pulse generated at both ends of the switching element 11 (see interval (c) in FIG. 4B and FIG. 4C).

Further, when the OFF timing of the switching element 21 is delayed, the current flowing into the resonance capacitor 23 is much smaller, and the pulse at both ends of the switching element 21 at this time is further narrower in the pulse width, and the pulse height is lower. That is, by controlling the phase of OFF timing of the switching element 21, the retrace pulse voltage applied to both ends of the horizontal deflection coil 4 can be controlled, so that the amplitude of the deflection current can be varied.

In FIG. 4, interval (d) is same as interval (b) in equivalent circuit, and its explanation is omitted.

<Trace Interval (e)>

When the damper diode 22 thus conducts, the circuit returns to the equivalent circuit in FIG. 5B, and the retrace operation continues same as in the ordinary deflection circuit until the voltage at both ends of the resonance capacitor 13 becomes 0, and at the end of retrace, it returns to the equivalent circuit in FIG. 5A, and the trace interval (e) starts. In this trace interval (e), a horizontal deflection current flows from the horizontal deflection circuit 4 in the forward direction of the damper diodes 12, 22 (see FIG. 4D). In this period, the switching elements 11, 21 are set in conductive state to be ready for next trace interval (a).

In this way, the horizontal deflection current repeats the deflection intervals (a), (b), (c), (d), and (e), and the horizontal deflection coil 4 forms a horizontal deflection magnetic field.

Next, the method of varying the amplitude of the horizontal deflection current by controlling the OFF timing of the switching element, and adjusting the pincushion distortion and the horizontal screen size is explained in detail below.

The maximum amplitude (PP value) Ipp of the horizontal deflection current is proportional to the integral value of the retrace pulse voltage applied to both ends of the horizontal deflection coil in the retrace interval. This retrace pulse voltage is about 1200 to 2200 volts, and it is divided into a low voltage that can be processed, and this voltage and the reference voltage expressing the amplitude of the horizontal deflection are compared, and the difference is integrated, and by feeding back to the drive signal of the switching element so that this integral value may be 0, thereby controlling the Ipp of the horizontal deflection current at high precision.

In the example shown in FIG. 1, retrace pulse voltages applied to the switching elements 11, 21 are detected respectively by the pulse reading circuits 17, 27. The detected voltage is obtained by dividing the retrace pulse voltage by capacitor or the like. The detected voltage is fed into the switching element control circuit 40, and the retrace pulse voltage (divided voltage) of the switching element 21 is subtracted from the retrace pulse voltage (divided voltage) of the switching element 11 by using a subtractor 41 such as operational amplifier. This differential voltage and the amplitude control voltage corresponding to the specified horizontal amplitude are compared in a comparator 42. This amplitude control voltage usually contains a parabolic voltage for correcting the pincushion distortion.

The compared voltages are integrated by an integrator 43 to be a direct-current voltage, which is fed into a phase regulator 44 as a signal for adjusting the phase (OFF timing)

of the drive signal of the switching element 21. The timing pulse formed in the phase regulator 44 forms a drive signal sufficient for driving the switching element 21, in a drive waveform generator 45. By such feedback loop, the switching element 21 produces a deflection current while controlling the OFF timing.

The explanation so far relates to the operation when the closed loop control system of OFF timing is in a stable operation state, but depending on the circuit constitution, it must be noted that the operation may be different in a transient period, such as starting moment when the power source is turned on.

In the control system shown in FIG. 1, the area of subtracting the voltage waveform (divided voltage) of the retrace pulse of the switching element 21 from the voltage waveform (divided voltage) of the retrace pulse of the switching element 11 changes linearly with respect to the amplitude of the deflection current. When the power source is turned on, the feedback loop is active so that retrace pulse may not be generated at both ends of the switching element 21 until the differential area reaches a specific size. In other words, retrace pulse is not generated at both ends of the switching element 21 until the retrace pulse at both ends of the switching element 11 reaches a specified wave crest value, so that stable starting is realized.

In this embodiment, as shown in FIG. 1, the connection middle point of the horizontal deflection coil 4 and S-curve correction capacitor 5 is grounded through a parallel circuit of an intermediate pincushion correction circuit 60 and a horizontal linearity correction circuit 70.

Figure 3A:
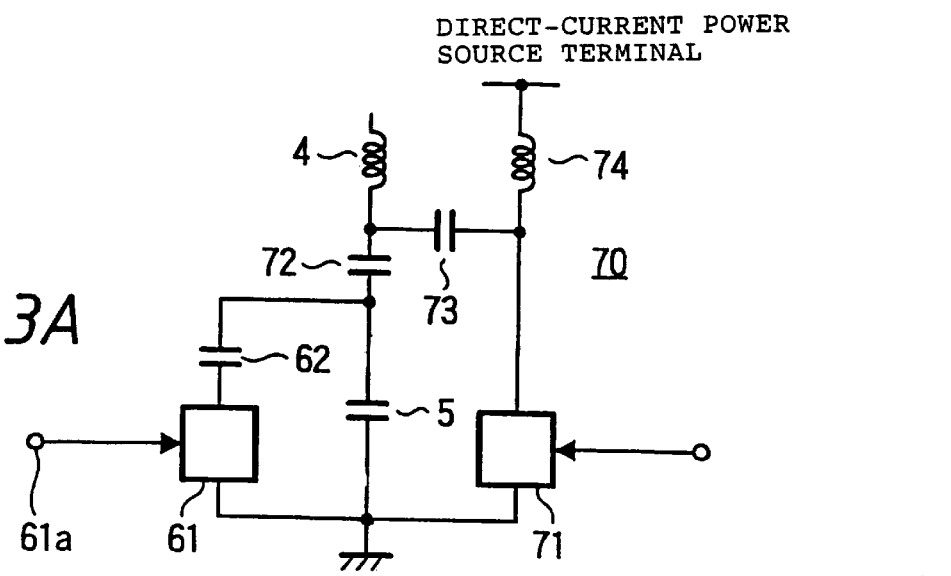
FIG. 3 is a line diagram for explaining the horizontal linearity correction in the horizontal deflection circuit shown in FIG. 1.
Figure 3B:
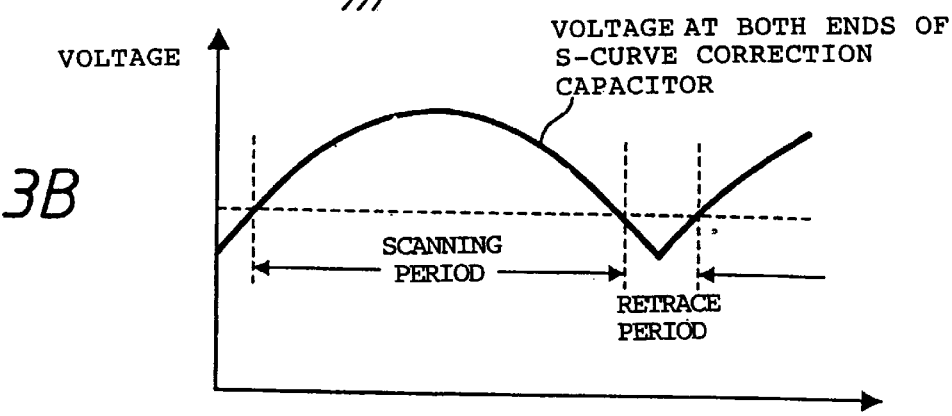

In this case, when resonating by connecting the S-curve correction capacitor 5 in series to the horizontal deflection coil 4 as shown in FIG. 1, the voltage at both ends of the S-curve capacitor 5 draws a curve as shown in FIG. 3B. This sinusoidal voltage component is superposed, the deflection current increases in the central area of the screen, and decreases in the peripheral area, so that the S-curve may be corrected. Therefore, by changing the voltage at both ends of the S-curve correction capacitor 5 as shown in FIG. 3B dynamically in the vertical scanning period, the intermediate pincushion distortion can be corrected.

Figure 2A:
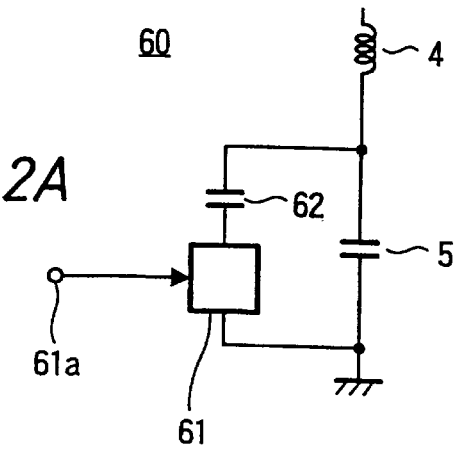
FIG. 2 is a line diagram for explaining the intermediate pincushion distortion correction in the horizontal deflection circuit shown in FIG. 1.

This intermediate pincushion distortion correction circuit 60 is composed, for example as shown in FIG. 2A, by connecting a series circuit of a capacitor 62 and a switching element 61 in parallel to the S-curve correction capacitor 5. By turning off this switching element 61 in the first half of the horizontal scanning period, the capacity of the S-curve correction capacitor can be changed over between the right and left part of the screen and the central part of the screen, thereby changing the amount of S-curve correction. That is, it is corrected by a parallel circuit of S-curve correction capacitor 5 and capacitor 62 in the right and left part of the screen, and corrected by the S-curve correction capacitor 5 only in the central part of the screen.

Figure 2B:
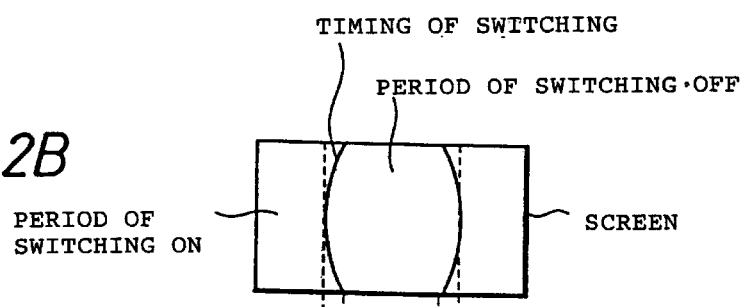
Figure 2C:
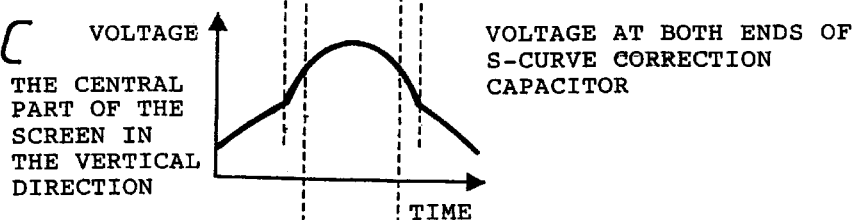
Figure 2D:
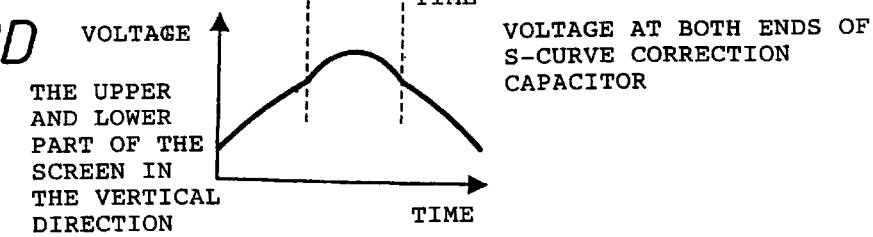

By modulating the switching timing of the switching element 61, the mode of correction of intermediate pincushion distortion is explained by referring to FIG. 2B, FIG. 2C, and FIG. 2D. In a switching signal input terminal 61a of the switching element 61, a drive signal modulated in pulse width in vertical scanning period is fed. At this time, in the upper and lower part of the screen in the vertical direction, the OFF timing of switching is delayed, while the OFF timing of switching is advanced in the central part of the screen in the vertical direction. Accordingly, in the central part of the screen in the vertical direction, the switching OFF timing is earlier, and the correction time by the S-curve correction capacitor 5 only is longer, and the S-curve correction amount increases. To the contrary, in the upper and lower part of the screen in the vertical direction, the correction amount is smaller, and the correction amount in the vertical scanning period can be changed dynamically, so that the intermediate pincushion distortion can be corrected.

The horizontal linearity correction circuit 70 is composed as shown in FIG. 3A, in which the connection middle point of a capacitor 72 connected in series to the horizontal deflection coil 4 and S-curve correction coil 5 is grounded through a series circuit of a direct-current blocking capacitor 73 and a switching element 71, and the connection middle point of the capacitor 73 and switching element 71 is connected to a direct-current power source terminal through a choke coil 74. The operation of this horizontal linearity correction circuit 70 turns off the switching element 71 in the horizontal scanning period, and turns on the switching element 71 in the retrace interval.

Figure 3C:
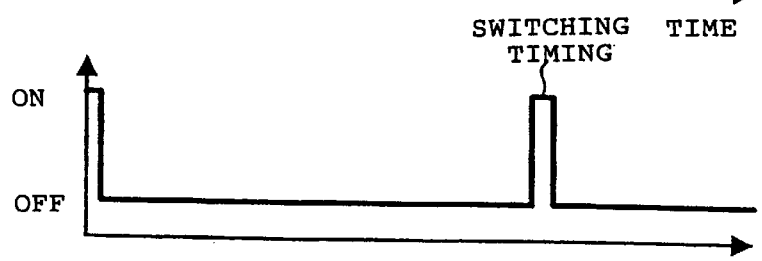
Figure 3D:
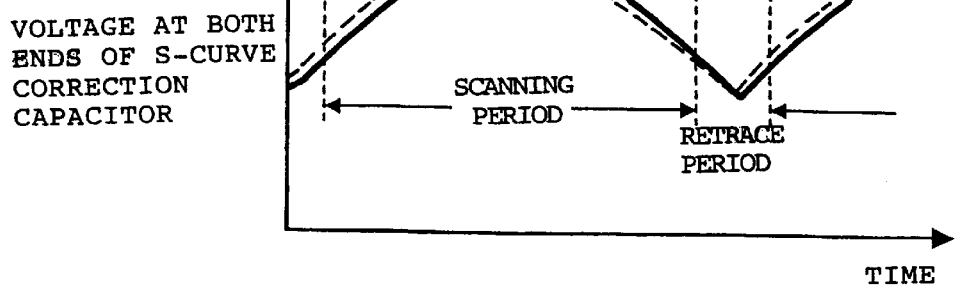

The horizontal deflection current is flowing by using the power source of the S-curve correction capacitor 5 in the scanning interval, and there is a proportional relation between the change rate of the horizontal deflection current and the voltage at both ends of the S-curve correction capacitor 5. Accordingly, while the deflection current is attenuating in the latter half of the scanning interval, the voltage at both ends of the S-curve correction capacitor 5 is also attenuated in the latter half of the scanning interval (dotted line in FIG. 3D). In the retrace interval, when the switching element 71 is turned on by the switching signal as shown in FIG. 3C, the current flows from the S-curve correction capacitor 5 through the switching element 71, and the voltage at both ends decreases. As a result, the rising timing of the voltage at both ends of the S-curve correction capacitor 5 is delayed, and the voltage at both ends decreases in the first half of the scanning period, whereas the voltage at both ends is elevated in the latter half (solid line in FIG. 3D).

When the ON time of this switching element 71 is longer, the corresponding current flows more from the S-curve correction capacitor 5 through the switching element 71, and the rising timing of the voltage at both ends of the S-curve correction capacitor 5 is further delayed, and the correction amount can be increased. Therefore, by modulating the ON time of switching in the vertical scanning period, the horizontal linearity correction amount can be changed in the vertical scanning period.

The intermediate pincushion distortion correction circuit 60 and horizontal linearity correction circuit 70 are not limited to the illustrated example alone. In parallel to the S-curve correction capacitor 5, various correction circuits can be incorporated, and the voltage for correction can be superposed at both ends of the S-curve correction capacitor, so that various deflection systems can be corrected easily. It is mostly because the circuit type in FIG. 1 is constituted by connecting the S-curve correction capacitor 5 connected in series to the horizontal deflection coil.

Figure 6:
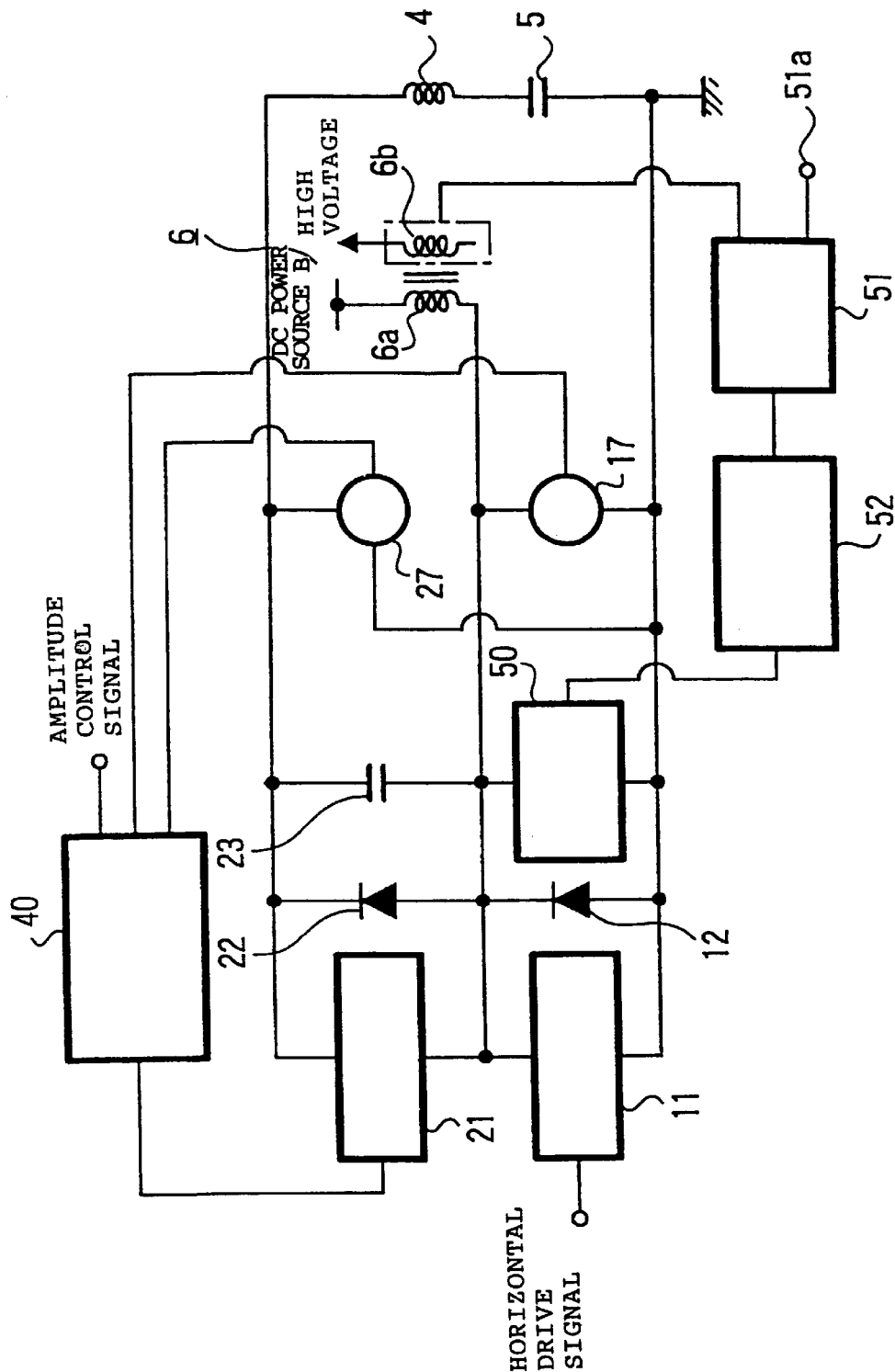
FIG. 6 is a structural diagram showing a second embodiment of a horizontal deflection circuit of the invention.
Figure 7:
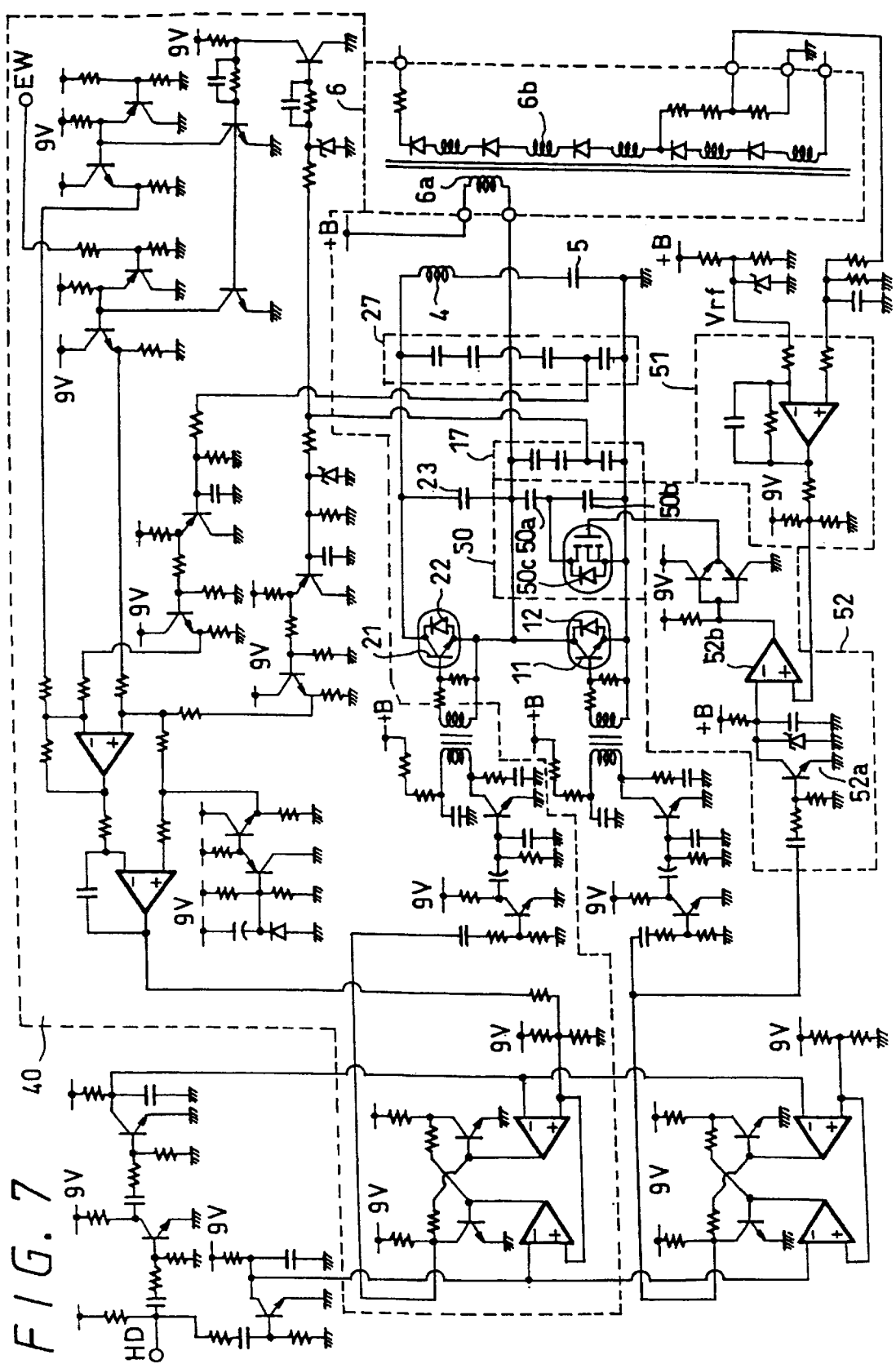
FIG. 7 is a wiring diagram showing a specific example of the horizontal deflection circuit shown in FIG. 6.

A second embodiment of a horizontal deflection circuit of the invention is described by referring to FIG. 6 and FIG. 7. In FIG. 6 and FIG. 7, same parts corresponding to FIG. 1 are identified with same reference numerals, and the detailed description is omitted.

As shown in FIG. 6, in the horizontal deflection circuit of the second embodiment, one end of a first parallel circuit connecting a switching element 11 for horizontal output, a damper diode 12 and a variable resonance capacitor 50 in parallel is grounded, other end of this first parallel circuit is connected to one end of a second parallel circuit connecting a switching element 21, a damper diode 22, and a resonance capacitor 23 in parallel, and a power source is supplied to this connection point through a primary winding 6a of a flyback transformer 6. At other end of this second parallel circuit, a horizontal deflection coil 4 is connected, and one end of an S-curve correction capacitor 5 is connected in series to this horizontal deflection coil 4, while other end of the S-curve correction capacitor 5 is grounded.

This horizontal deflection circuit comprises pulse reading circuits 17, 27 for reading the terminal voltage of the switching elements 11, 21, and a switching element control circuit 40 for controlling on/off of the switching element 21 by operating as specified on the basis of this voltage.

In the variable resonance capacitor 50 of this embodiment, as shown specifically in FIG. 7, two capacitors 50a and 50b of specified capacity are connected in series, and the connection middle point of the capacitors 50a and 50b is grounded through a switching element 50c, and this switching element 50c is controlled as described below, the capacity of the variable resonance capacitor 50 is varied in the horizontal retrace interval, and therefore the high voltage direct-current voltage obtained from the secondary winding 6b of the flyback transformer 6 may be kept constant.

A high voltage detected voltage corresponding to the high voltage direct-current voltage obtained at the secondary winding 6b side of the flyback transformer 6 is supplied to one input terminal of an error amplifier 51, while a reference voltage Vrf is supplied into other input terminal from a reference voltage input terminal 51a, and the high voltage detected voltage and reference voltage Vrf are compared in the error amplifier 51, and when the high voltage detected voltage exceeds the reference voltage Vrf, the control signal is supplied into this switching element 50c through a resonance capacitor capacity control circuit 52.

That is, in the example shown in FIG. 6, the voltage corresponding to the high voltage direct-current voltage obtained at the secondary winding 6b side of the flyback transformer 6 is detected by resistance division, and this high voltage detected voltage is compared with the predetermined reference voltage Vrf in the error amplifier 51, and it is designed to feed back so as to increase the capacity of the variable resonance capacitor 50 when this high voltage detected voltage exceeds the reference voltage Vrf.

In this manner, change of high voltage direct-current voltage due to fluctuations of screen size, and fluctuations of high voltage direct-current voltage due to brightness of the screen can be suppressed.

A specific structural example of the circuit diagram shown in FIG. 6 is given in FIG. 7. The variable resonance capacitor 50 shown in FIG. 7 is composed, as describe above, by connecting two capacitors 50a and 50b in series, conducting both ends of the capacitor 50b at the grounding side in the horizontal retrace interval by the switching element 50c, and the capacity of the resonance capacitor 50 in this horizontal retrace interval is changed over in binary system.

In the example shown in FIG. 7, the average capacity in the horizontal retrace interval can be varied before and after the period in the horizontal retrace interval of OFF timing of the switching element 50c, and the variable resonance capacitor 50 is formed equivalently.

That is, when the OFF timing is late, the capacity is large equivalently, and the OFF timing is early, the capacity is small equivalently.

This OFF timing is determined by comparison between the sawtooth wave generated by a sawtooth wave generating circuit 32a composing the resonance capacitor capacity control circuit 52 in FIG. 7 and the direct-current output of the error amplifier 51 in the comparator 52b.

Thus, when the high voltage direct-current voltage supplied to the anode of the CRT is raised, and the high voltage detection voltage of the high voltage direct-current voltage obtained from the secondary winding 6b of the flyback transformer 6 exceeds the reference voltage Vrf, the output direct-current voltage of the error amplifier 51 climbs up, and the capacity of the variable resonance capacitor 50 is increased equivalently, and the wave crest value of the horizontal retrace pulse is lowered, finally forming a feedback loop for lowering the high voltage direct-current voltage supplied to the anode of the CRT.

If the high voltage direct-current voltage obtained at the secondary winding side 6b of the flyback transformer 6 is lowered, the feedback loop is inverted in the high-low voltage relation.

The operation of the horizontal deflection circuit shown in FIG. 6 is explained below, and the basis deflection operation is same as the operation of the horizontal deflection circuit shown in FIG. 1, and the explanation is omitted. However, in the horizontal deflection circuit shown in FIG. 1, the resonance capacitor 13 of fixed capacity is used, whereas the variable resonance capacitor 50 is used in the horizontal deflection circuit shown in FIG. 6.

Similarly, the operation of varying the amplitude of the horizontal deflection current by controlling the OFF timing of the switching element and adjusting the pincushion distortion and the horizontal screen size is same as the operation of the horizontal deflection circuit shown in FIG. 1, and its explanation is also omitted.

In the horizontal deflection circuit shown in FIG. 6, the high voltage detection voltage in the horizontal retrace period of the high voltage direct-current voltage obtained from the secondary winding 6b side of the flyback transformer 6 and the reference voltage Vrf are compared, and when the high voltage detected voltage exceeds the reference voltage Vrf, feedback is applied so that the capacity of this variable resonance capacitor 50 may be large, and therefore change of high voltage direct-current voltage due to fluctuations of screen size and fluctuations of high voltage direct-current voltage due to brightness of the screen can be suppressed, so that the high voltage direct-current voltage can be stabilized.

Figure 8:
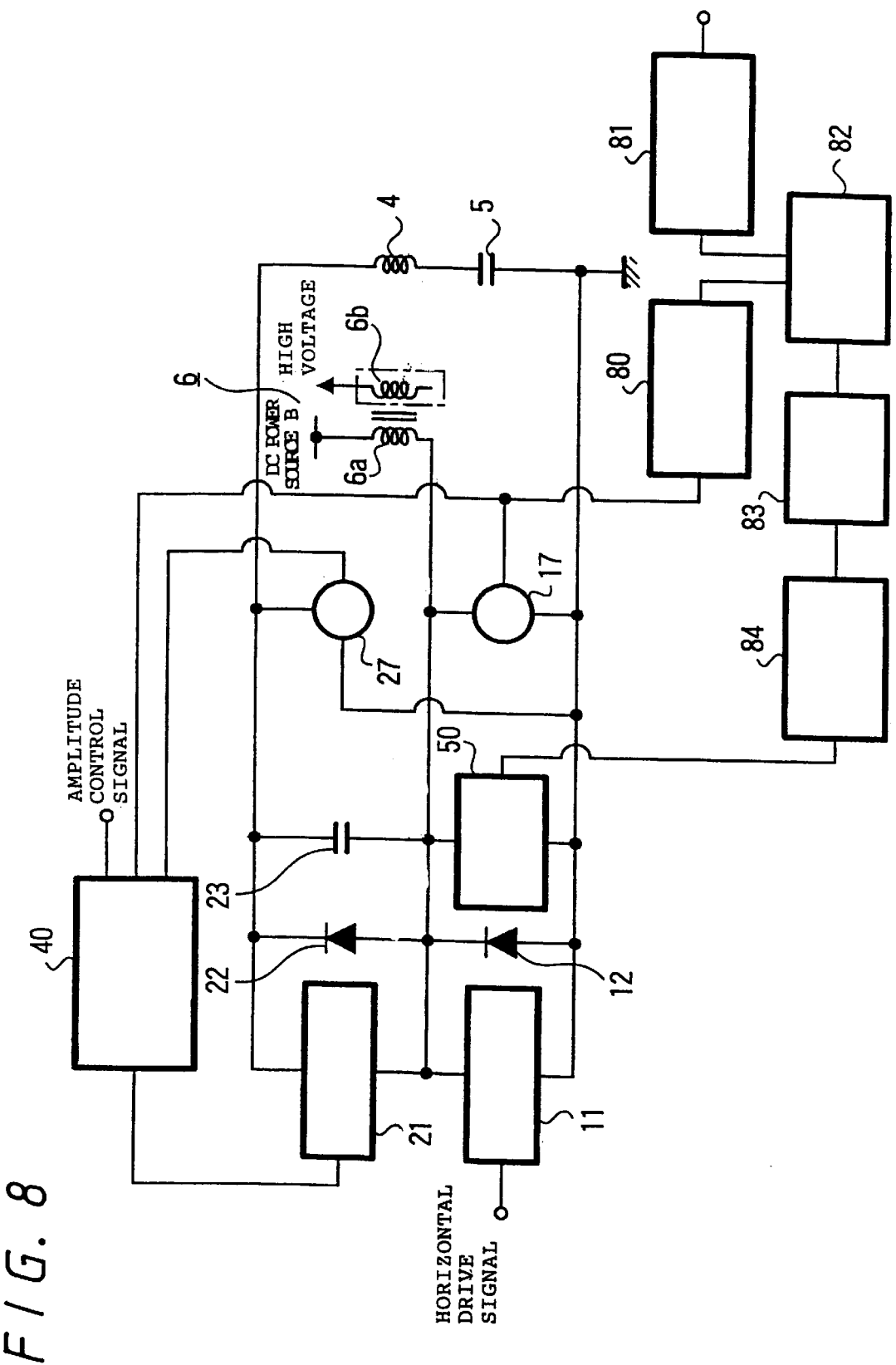
FIG. 8 is a structural diagram showing a third embodiment of a horizontal deflection circuit of the invention.

FIG. 8 shows a third embodiment of a horizontal deflection circuit of the present invention. The circuit shown in FIG. 8 is described below, and the parts corresponding to the circuit shown in FIG. 6 are identified with same reference numerals, detailed description is omitted.

The circuit shown in FIG. 8 is to control the capacity of the variable resonance capacitor 50 of the circuit shown in FIG. 6 so as to keep constant the pulse width generated in the horizontal retrace interval at both ends of the variable resonance capacitor 50.

That is, in the circuit shown in FIG. 8, the voltage of the pulse generated at both ends of the switching element 11 is read by a pulse reading circuit 17, and the detected rectangular pulse having a pulse width corresponding to the voltage of this pulse is shaped in a pulse width rectangular wave generating circuit 80, and a predetermined reference specific width rectangular wave is formed in a specific width rectangular wave generating circuit 81, and the detected rectangular wave and the specific width rectangular wave are supplied into a subtractor 82 and compared. When the width of the detected rectangular wave is smaller than the width of the specific width rectangular wave, the control signal from the subtractor 82 is supplied into the variable resonance capacitor 50 through the amplifier 83 and the variable capacitor capacity control circuit 84, and feedback is applied so as to increase the capacity of the variable resonance capacitor 50, and the pulse width generated in the horizontal retrace interval at both ends of the variable resonance capacitor 50 is kept constant.

In the example shown in FIG. 8, the other parts operate same as in the example shown in FIG. 6.

The horizontal deflection circuit shown in FIG. 8 is similar to the horizontal deflection circuit shown in FIG. 6 in its horizontal deflection operation, and the pulse width generated at both ends of the variable resonance capacitor 50, that is, in the horizontal retrace interval obtained in the flyback transformer 6 is kept constant, so that change of high voltage direct-current voltage due to fluctuations of screen size can be suppressed.

The present invention is not limited to the above examples only, but may be changed and modified within the scope of the invention.

According to the present invention, as described herein, using two switching elements, a voltage of about 2 kV can be applied to the horizontal deflection coil, and the horizontal deflection current of double speed scanning is regulated to the level of normal scanning, so that the power consumption is saved and the cost is lowered substantially in the horizontal deflection circuit, which is provided with the intermediate pincushion distortion correction circuit and horizontal linearity correction circuit, so that various corrections same as in the horizontal deflection circuit of the conventional diode modulation system may be realized.

Also according to the present invention, as compared with the case of using the horizontal linearity correction coil, the voltage applied to the horizontal deflection coil may be larger, and therefore the power consumption is saved and heat generation is suppressed, and moreover since the linearity characteristic can be corrected by switching operation, the adjustments are easy, and the cost is lower than the case when correcting by using the coil.

Moreover, the invention is capable of suppressing and stabilizing the changes of high voltage direct-current voltage supplied to the anode of the CRT.

What is claimed is:

1. A horizontal deflection circuit characterized by:

grounding one end of a first parallel circuit connecting a first switching element, a first damper diode, and a first resonance capacitor in parallel, connecting the other end of said first parallel circuit to one end of a second parallel circuit connecting a second switching element, a second damper diode, and a second resonance capacitor in parallel, and further connecting the connection point of said the other end of said first parallel circuit and said one end of said second parallel circuit to a direct-current power source through a primary winding of a flyback transformer, grounding said the other end of said second parallel circuit through a series circuit of a horizontal deflection coil and an S-curve correction capacitor, grounding the connection middle point of said horizontal deflection coil and S-curve correction capacitor through a parallel circuit of an intermediate pincushion distortion correction circuit and a horizontal linearity correction circuit, and installing switching element control means for switching said first switching element by a horizontal drive signal, and controlling the OFF start timing and OFF period of said second switching element.

2. A horizontal deflection circuit characterized by:

grounding one end of a first parallel circuit connecting a first switching element, a first damper diode, and a first resonance capacitor in parallel, connecting the other end of said first parallel circuit to one end of a second parallel circuit connecting a second switching element, a second damper diode, and a second resonance capacitor in parallel, and further connecting the connection point of said the other end of said first parallel circuit and said one end of said second parallel circuit to a direct-current power source through a primary winding of a flyback transformer, grounding said the other end of said second parallel circuit through a series circuit of a horizontal deflection coil and an S-curve correction capacitor, installing switching element control means for switching said first switching element by a horizontal drive signal, and controlling the OFF start timing and OFF period of said second switching element, installing capacity varying means for varying the capacity of said first resonance capacitor, and keeping constant the high voltage generated by said flyback transformer by varying the capacity of said first resonance capacitor in a horizontal retrace interval.

3. The horizontal deflection circuit of claim 2, wherein said capacity varying means for varying the capacity of said first resonance capacitor is controlled on the basis of the high voltage generated by said flyback transformer.

4. The horizontal deflection circuit of claim 2, wherein said capacity varying means for varying the capacity of said first resonance capacitor is controlled so as to keep constant the pulse width generated in the horizontal retrace interval at both ends of said resonance capacitor.

* * * * *